L. COPPOCK.
WAGON FRAME.
APPLICATION FILED MAR. 27, 1917.

1,342,254.

Patented June 1, 1920.
2 SHEETS—SHEET 1.

Lambert Coppock
Inventor

By Geo. P. Kimmel
Attorney

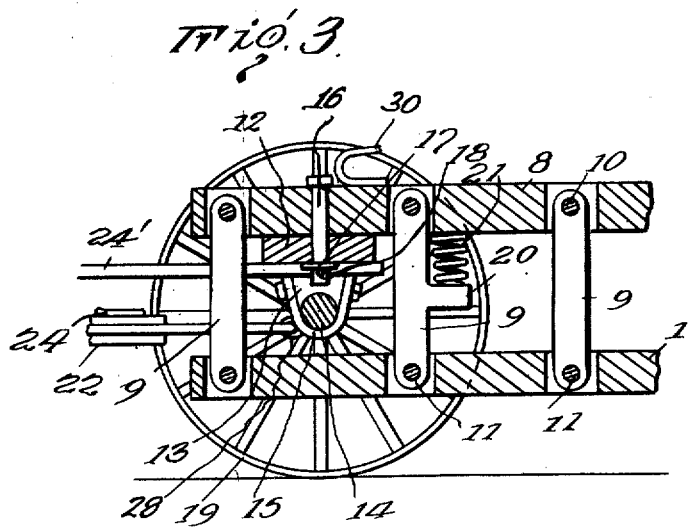
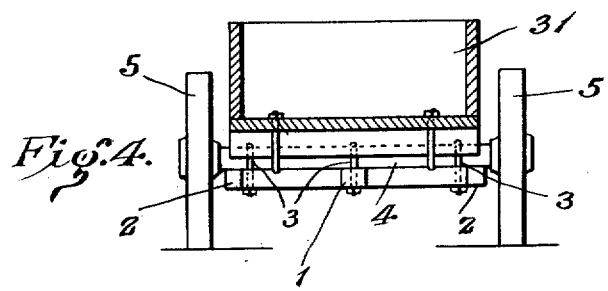
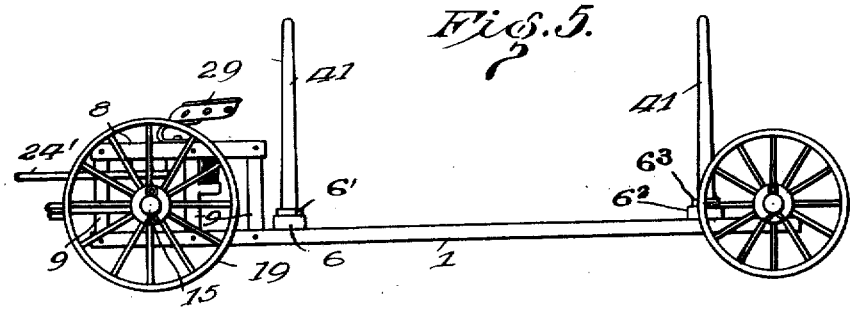

UNITED STATES PATENT OFFICE.

LAMBERT COPPOCK, OF BERLIN, OREGON.

WAGON-FRAME.

1,342,254.　　　　Specification of Letters Patent.　　Patented June 1, 1920.

Application filed March 27, 1917. Serial No. 157,694.

*To all whom it may concern:*

Be it known that I, LAMBERT COPPOCK, a citizen of the United States, and resident of Berlin, in the county of Linn and State of Oregon, have invented certain new and useful Improvements in Wagon-Frames, of which the following is a specification.

This invention relates to wagon supports, more particularly to devices of this character employed for supporting a wagon while being tilted to discharge its load, and has for one of its objects to simplify and improve the construction and increase the efficiency and utility of devices of this character.

Another object of the invention is to provide a vehicle of this character having an improved draft appliance to permit the gradual application of the force of the draft animals and thereby obviate danger of strain or other injury to the animals while loading the vehicle.

Another object of the invention is to provide a wagon in which the wheel receiving axles are so mounted as to cause an indirect pull to be imparted to the rear axles, thereby reducing the starting draft to the minimum.

With these and other objects in view the invention consists in certain novel features of construction as hereafter shown and described and then specifically pointed out in the claims, and in the drawing illustrative of the preferred embodiments of the invention;

Fig. 3 is an enlarged vertical longitudinal section through the draft connection.

Fig. 4 is a rear elevation of the rear axle and its coacting parts.

Fig. 5 is a side elevation of the improved device when adapted as a log or lumber hauling wagon.

Similar characters or references are employed in all of the views of the drawings to indicate corresponding parts.

Figure 1:
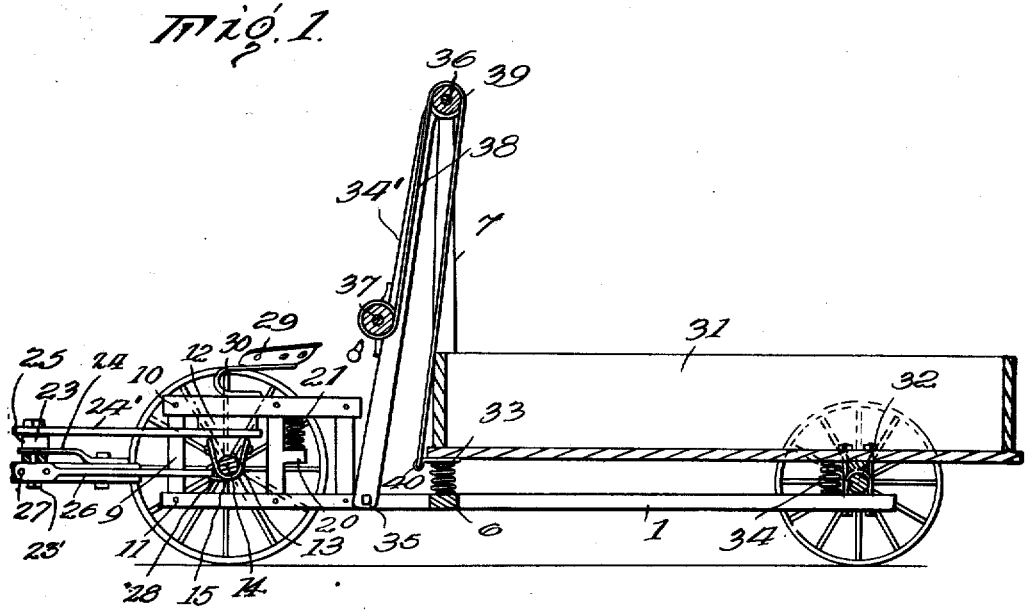
Figure 1 is a vertical longitudinal section through the improved wagon support with the dumping body arranged thereon.
Figure 2:
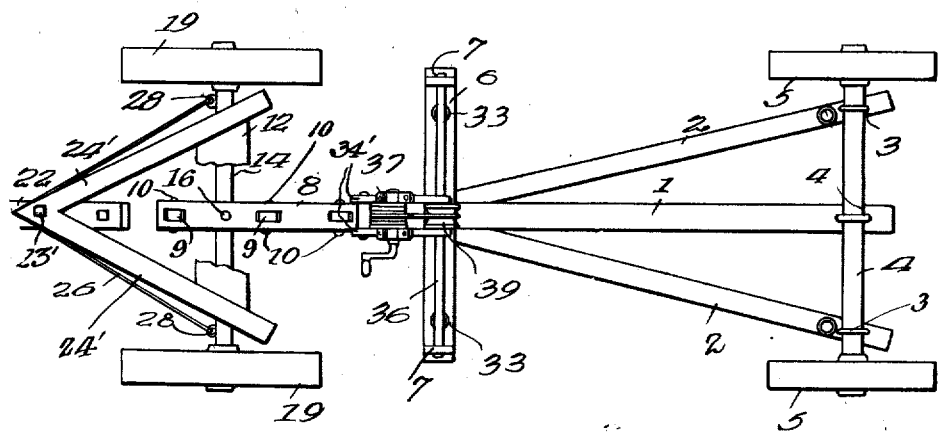
Fig. 2 is a top plan view without the dumping body.

The improved wagon support comprises a central member or reach 1 having obliquely directed hounds 2 leading rearwardly from an intermediate point thereof. The rear axle is represented at 4 and is secured to the reach member 1 and the hounds 2 by suitable clips 3, with the rear carrier wheels 5 supported upon the journals of the axle in the usual manner.

A cross bar 6 is arranged upon the reach bar 1, intermediate the ends.

Rising from the bar 6 near its ends are vertical members 7 and connected at their upper ends by a transverse shaft 36, the latter having a cable guide pulley 39 intermediate the same.

Near its center, and adjacent to the sides of the pulley 39 are oblique standards 34' connected at 35 to the reach 1 upon opposite sides.

Arranged above and spaced from the forward end of the reach member 1 is a longitudinally disposed bar 8, the said bar 8 being movably supported upon the reach member through the medium of a plurality of links indicated by the numeral 9, the upper ends of which are passed through suitable openings in the longitudinally disposed bar and are pivotally connected thereto by passing bolts 10 or the like through the same into engagement with said upper ends. The lower ends of the links 9 are received in similar openings formed in the forward end of the reach member 1 and are in turn pivotally connected thereto by means of bolts 11 or the like which are passed through the said forward extremity of the reach member into engagement with the lower ends of the links. To the underside of the longitudinal bar 8 and in proximity to one extremity thereof, is affixed a transversely disposed axle supporting element 12, the same carrying upon its opposite end portions a plurality of axle bearings 13 to receive an axle 14, the said axle being secured in position by means of straps 15 which are passed about the lower portions of the axle and secured to the bearings 13 by passing suitable fastening devices through the straps and into engagement with the bearings. It may be here noted that the rear axle 4 is mounted in its respective bearings 3 in a plane lower than the mounting of the axle 14, thus allowing an indirect pull to be imparted to rear axle 4 from the wheels mounted on the forward axle and reducing the starting draft to a minimum. A king bolt 16 is passed downwardly through an opening formed in the bar 8 and through a similar opening formed in the axle supporting element 12. The king bolt 16 is secured in position with relation to the bar and axle supporting element by means of a washer or bearing plate 17 arranged over the lower end of the king bolt and held firmly in position thereon through the medium of a cotter pin 18 which passes through the bolt. By so arranging the king bolt 16, it is obvious that the axle 14 may be readily turned and hence the wheels 19 carried upon the spindle portions thereof may be moved thereby when cramped to turn the wagon.

To normally maintain the supporting links 9 upon which the longitudinally disposed bar 8 is arranged in upright position with relation to the forward portion of the reach member 1, there is formed upon one of the said links a laterally offset portion 20, which portion seats the lower convolution of an expansible coiled spring 21, the upper convolution of the spring engaging the adjacent portion of the under face of the bar 8. Hence, when the links 9 are inclined with relation to the reach member 1 and the bar 8, the coiled spring 21 will be placed under tension and will gradually return the said links 9 to their normally upright positions as the strain thereupon diminishes or decreases.

Forwardly diverging hounds 24' are connected at their rear ends between the member 12 and the bearings 13, and are connected at their forward ends to the draft tongue 22 by a spacer block 25 and tie bolt 23'. Obliquely directed ties or brace members 26 extend between the tongue 22 and the axle 14, to which they are coupled by eye bolts 28 or like devices. A locking nut of suitable construction is preferably applied to the bolt 23', as indicated in Fig. 1.

A seat 29 is preferably arranged upon the upper face of the longitudinal bar 8 and supported thereon by a spring arm 30.

A dumping body 31 is pivotally supported upon the rear axle 4 and has the forward end of the same resting upon a plurality of expansible coiled springs 33 seated upon the opposite extremities of the cross bars 6. Springs 34 similar to the springs 33 are also arranged adjacent the pivotal mounting of the dumping body 31 and obviously serve to cushion the return of the body to normal position with relation to the wagon frame.

To provide means whereby the body 31 may be raised to discharge or dump the contents thereof, a plurality of spaced standards 34' are secured to the forward portion of the reach bar 1 as at 35, preferably, upon the opposite sides of the reach bar and have the upper extremities thereof apertured to receive a transversely disposed shaft 36 mounted in suitable bearings formed in the upper extremities of the uprights 7. A windlass 37 is arranged upon the standards 34' intermediate their ends and is provided with a cable 38, which cable extends upwardly over a pulley 39 mounted upon the shaft 36, thence downwardly into engagement with an arm 40 secured to the forward portion of the dumping body 1. By coiling the cable 38 about the windlass, the forward portion of the dumping body will be elevated, thereby allowing the contents of the same to be discharged or dumped. To return the body to its normal position upon the wagon frame, the windlass 37 is rotated in a reverse or counter direction and permits the body to gradually reseat upon the expansible coiled springs 33 and 34.

In Fig. 5 I have shown a slightly modified form of my wagon frame, whereby the same may be used as a log or lumber hauling wagon, the dumping body 31 together with the uprights 7, the standards 34' and the windlass 37 having been removed. Suitable sockets 6' are formed in the opposite extremities of the cross bar 6 while a second cross bar 6² is arranged adjacent the rear axle 4. The bar 6² is supplied with sockets one of which is represented at 6³. Stakes 41 are supported in the sockets of the members 6 and 6' to retain the load in position.

From the above, it will be obvious that a simply constructed vehicle is produced capable of adaptation to various types of bodies and to carrying material of various kinds.

By means of the draft appliance herein disclosed the draft is materially lessened in starting the load.

The arrangement shown, with the rear wheels smaller than the forward wheels also insures a lessening of the draft since an indirect pull is imparted to the rear wheels which are mounted below the horizontal plane of the forward wheels.

As the team is started, the member 8 and its attachments yield sufficiently to prevent undue strain upon the draft animals, and when the strain is removed the parts are automatically restored to normal position by the reaction of the spring 21.

I claim:

1. In a vehicle including a reach member and a forward axle, a draft appliance connected to the forward axle, a member rigidly connected to the forward axle and movably coupled to the reach member, and means operating to maintain the draft appliance in normal position relative to the reach member and yieldable under the forward pull of the draft power.

2. In a vehicle including a reach and a forward axle, a draft appliance connected to the forward axle, a member rigidly connected to the forward axle, a plurality of links pivotally connected respectively to the rigidly connected member and to the reach, and a spring between one of said links and the rigidly connected member and operating to maintain the draft appliance in normal position relative to the supporting body and yieldable under the forward pull of the draft power.

3. In a vehicle including a reach member and a forward axle, a member directed transversely of the reach member and longitudinally of the axle and supported therefrom, diverging members connected to the transversely directed member, a draft tongue connected to the diverging members, a bar rigidly connected to the transverse member and longitudinally of the reach member, a plurality of links pivoted respectively to the bar and to the reach member, and yieldable means between the reach and the bar.

4. In a vehicle, a longitudinally directed reach member, a rear axle rigidly connected to the reach member, bearing wheels mounted on the rear axle, a forward axle, bearing wheels mounted on the forward axle, a draft appliance connected to the forward axle, a device rigidly connected to the forward axle, means for movably coupling said rigidly connected device to the reach member and operating to maintain the draft appliance in normal position relatively to the reach member and yieldable under the forward pull of the draft power.

5. In a vehicle, a longitudinally directed reach member, a rear axle rigidly connected to the reach member, bearing wheels mounted on the rear axle, a forward axle, bearing wheels mounted on the forward axle, a draft appliance connected to the forward axle, a device rigidly connected to the forward axle, a plurality of links pivotally connected respectively to the rigidly connected device and the reach member, and a spring coupling one of said links to the rigidly connected device and operating to maintain the rigid device and the forward axle carried thereby in normal position relatively to the reach member and yieldable under the forward pull of the draft power.

In testimony whereof I affix my signature hereto.

LAMBERT COPPOCK.